(12) United States Patent
Showalter

(10) Patent No.: US 10,882,977 B1
(45) Date of Patent: Jan. 5, 2021

(54) EARTH PLANT COMPOSTABLE BIODEGRADABLE SUBSTRATE AND METHOD OF PRODUCING THE SAME

(71) Applicant: Edward Showalter, Los Angeles, CA (US)

(72) Inventor: Edward Showalter, Los Angeles, CA (US)

( * ) Notice: Subject to any disclaimer, the term of this patent is extended or adjusted under 35 U.S.C. 154(b) by 0 days.

(21) Appl. No.: 16/777,783

(22) Filed: Jan. 30, 2020

(51) Int. Cl.
*C08L 3/04* (2006.01)
*C08L 23/06* (2006.01)
*C08K 3/26* (2006.01)

(52) U.S. Cl.
CPC ........ *C08L 3/04* (2013.01); *C08K 3/26* (2013.01); *C08L 23/06* (2013.01); *C08K 2003/265* (2013.01); *C08L 2201/06* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,662,731 A * | 9/1997 | Andersen | ............... | B01F 3/1214 106/206.1 |
| 5,679,145 A * | 10/1997 | Andersen | ............... | B01F 3/1214 106/162.5 |
| 6,231,970 B1 * | 5/2001 | Andersen | ............... | C08L 3/02 106/145.1 |
| 6,235,815 B1 * | 5/2001 | Loercks | ............... | B32B 27/10 524/47 |
| 6,379,446 B1 * | 4/2002 | Andersen | ............... | C08L 1/02 106/137.1 |
| RE39,339 E * | 10/2006 | Andersen | ............... | 106/206.1 |
| 2003/0077444 A1 * | 4/2003 | Bond | ............... | D01F 8/06 428/364 |
| 2007/0021534 A1 * | 1/2007 | Glenn | ............... | C08L 3/02 524/47 |
| 2008/0103232 A1 * | 5/2008 | Lake | ............... | C08K 5/09 523/124 |
| 2008/0287592 A1 * | 11/2008 | Favis | ............... | C08J 3/005 524/500 |
| 2011/0158455 A1 * | 6/2011 | Kim | ............... | C08L 3/02 381/370 |
| 2012/0009387 A1 * | 1/2012 | Wang | ............... | C08J 5/18 428/141 |
| 2012/0022188 A1 * | 1/2012 | Changping | ............... | C08J 5/18 524/52 |
| 2012/0139154 A1 * | 6/2012 | Huneault | ............... | B29B 7/46 264/211.23 |
| 2012/0289629 A1 * | 11/2012 | Saint-Loup | ............... | C08L 3/02 524/53 |
| 2012/0315454 A1 * | 12/2012 | Wang | ............... | B29D 7/01 428/220 |
| 2013/0069280 A1 * | 3/2013 | Altonen | ............... | B29C 45/77 264/328.1 |
| 2013/0109781 A1 * | 5/2013 | Lake | ............... | C08K 5/09 523/124 |
| 2013/0154151 A1 * | 6/2013 | Wang | ............... | C08L 67/03 264/177.1 |
| 2013/0158169 A1 * | 6/2013 | Bond | ............... | C08L 23/10 524/51 |
| 2014/0272370 A1 * | 9/2014 | Broyles | ............... | C08L 23/26 428/220 |
| 2016/0174684 A1 * | 6/2016 | Ellsworth | ............... | A45D 40/04 401/55 |
| 2017/0204229 A1 * | 7/2017 | Yuan | ............... | C08L 97/02 |
| 2018/0118902 A1 * | 5/2018 | Milazzo | ............... | C08L 55/02 |
| 2018/0327588 A1 * | 11/2018 | Marcille | ............... | C08J 5/18 |

OTHER PUBLICATIONS

Shujun et al. (Journal of Polymers and the Environment, vol. 14, No. 1, Jan. 2006, p. 65-70) (Year: 2006).*
Tsiropoulos et al. (Journal of Cleaner Production 90 (2015) 114-127) (Year: 2015).*

* cited by examiner

*Primary Examiner* — Liam J Heincer
(74) *Attorney, Agent, or Firm* — CIONCA IP Law P.C.; Marin Cionca

(57) ABSTRACT

An earth plant-based compostable biodegradable composition for the formation of a bioplastic and method of producing said resin, the composition comprising: about 17.5 to 45% ethanol-based green polyethylene by weight, about 20 to 25% calcium carbonate by weight, about 2 to 12% hemp hurd or soy protein by weight, about 32 to 45% thermoplastic starch by weight, and about 0.5 to 1% biodegradation additive by weight to enable biodegradation and composting of the bioplastic; wherein the composition is produced by first mill grinding the ethanol-based green polyethylene, calcium carbonate, hemp hurd or soy protein, thermoplastic starch and the biodegradation additive into fine powders, then mechanically mixing the fine powders one by one into a final mixture for about 5-25 minutes at a time, dry and without heat, and then heating the final mixture to about 220- to 360-degrees Fahrenheit.

7 Claims, 1 Drawing Sheet

EARTH PLANT COMPOSTABLE BIODEGRADABLE SUBSTRATE AND METHOD OF PRODUCING THE SAME

BACKGROUND OF INVENTION

1. Field of the Invention

The invention relates generally to compositions, and more specifically to an earth plant-based composition having eco-friendly properties, which can be effectively used to produce bioplastic for food and beverage containers, packaging material and in other related applications.

2. Description of the Related Art

Petroleum-based resins, such as polyethylene phthalate, nylon, polyolefin and plasticized polyvinyl chloride (PVC), are widely used today for a wide range of applications, such as for packaging material, automotive parts, home appliances, toys, and the like. However, such petroleum-based resins are not compostable or biodegradable, thereby causing environmental harm, in the form of greenhouse gas emissions and pollution, as examples. Recently, in response to such effects, the use of biomass-based resins, typically polylactic acid (PLA) resins, have become very popular, and is widely considered as an alternative to petroleum-based plastic. However, the high cost associated with producing polylactic acid and its current limited supply render this alternative to petroleum-based plastic economically infeasible.

Additionally, polylactic acid resins have poor heat and moisture resistance, and lack the flexibility necessary for certain applications, such as in packaging films and bottles. The mechanical properties of PLA are lacking in comparison with petroleum-based resins (e.g., high flow rate makes PLA unsuitable for blow molding); it has been suggested that low-molecular weight flexibilizers or plasticizers be added to the PLA resins, or additives be added to slow the melt flow rate. However, the packaging films still exhibit poor stability and brittleness, rendering the PLA resin disadvantageous. In addition, testing revealed that the currently available additives make the resulting composition nonbiodegradable.

Generally, as described above, PLA resins are very vulnerable to moisture, lack flexibility, and are sensitive to heat. The presence of moisture may cause a hydrolysis reaction, which results in molecular weight degradation. The lactic acid, monomers and oligomers produced may be subject to volatilization during a molding process (e.g., plastic-injection molding) and may corrode the equipment or deteriorate the quality of the finished products. Therefore, many manufacturers who utilize plastic-injection molders, blow molders, extruders, and film sheet producers do not want to run polylactic acid resin in their equipment.

Alternatively, Green polyethylene (e.g., I'm Green™ Polyethylene) has been employed in compositions as an alternative for polyethylene made from petroleum. Green polyethylene (PE), which is made from ethanol derived from feedstocks (e.g., sugarcane and sugar beet), combines high performance and processability. Plastics made from Green polyethylene are recyclable, similar to conventional polyethylene products, and Green PE is also renewable, and therefore possesses the ability to help reduce greenhouse gas emissions. However, Green PE is not biodegradable or compostable, and thus may still contribute to the pollution of landfills and oceans.

Likewise, a stone-based copolymer substrate resin has been developed as a replacement composition for tree-based paper, hard paper and limited plastic goods. More particularly, this substrate resin relates to a limestone-based copolymer substrate, which may be used as a replacement composition for limited goods currently manufactured from tree-based or petroleum-based substances. Due to stone-based copolymer substrate resins' inability to be applied in making films, the resins cannot be used to generally replace petroleum-based plastic products. Moreover, the stone-based resin contains a high concentration of calcium carbonate (CaCO3), ranging from approximately fifty to eighty-five percent (50-85%) by weight and varying in diameter generally from 0.25 to 3.0 microns. Because of the presence of the calcium carbonate, products made from the stone-based resin have disadvantages of an increase in haze and a major decrease in transparency. Thus, there have been many limitations of the fields and applications to which this resin is applicable.

In general, plastics currently available in the marketplace are typically petroleum-based and require large amounts of processing energy and cost to produce. Unfortunately, petroleum is derived from crude oil, which is currently in limited supply and in high demand. Crude oil is not a renewable material. Less than half of every barrel of crude oil extracted from the ground is refined into gasoline. The rest of the barrel may be used in the production of many other major types of goods, like kerosene, asphalt, antifreeze, cleaning fluids, and the like. Petroleum-based plastic products are typically not biodegradable or compostable, which creates a huge environmental problem globally and leads to disposal issues once the product has been used.

Therefore, there is a need to solve the problems described above by providing an earth plant-based compostable and biodegradable composition having eco-friendly properties, and methods of manufacturing said resin.

The aspects or the problems and the associated solutions presented in this section could be or could have been pursued; they are not necessarily approaches that have been previously conceived or pursued. Therefore, unless otherwise indicated, it should not be assumed that any of the approaches presented in this section qualify as prior art merely by virtue of their presence in this section of the application.

BRIEF INVENTION SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In an aspect, an earth plant-based compostable biodegradable (EarthPCB) composition is provided comprising a composition of blended earth and copolymer substrates. The composition may be provided with ethanol-based Green polyethylene (e.g., I'm Green™ Polyethylene) from approximately fifteen percent to seventy-five percent (15-75%) by weight. The composition may also include calcium carbonate (CaCO3) from approximately fifteen to sixty percent (15-60%) by weight. The composition may also include hemp hurd, which is 100% biodegradable and recyclable, and may be provided from two percent up to seventy-five percent (2-75%) by weight. The composition may also include thermoplastic starch, which is 100% biodegradable on its own, and may be provided from about twenty percent up to sixty percent (20-60%) by weight. The EarthPCB resin may also include a biodegradation additive from approximately half of a percent up to ten percent (0.5-10%) by weight. Thus, an advantage of the EarthPCB substrate may be that resulting products are as strong or stronger than petroleum-based plastic, while also being compostable, biodegradable, recyclable and non-toxic to the environment.

In another aspect, an earth plant-based compostable biodegradable composition is provided, wherein the composition may include soy protein, soy polyols, or soy plastic provided from approximately two percent to ten percent (2 to 10%) by weight. The EarthPCB resin may be provided with the soy protein in substitution of the hemp hurd, resulting in a composition comprising ethanol-based Green polyethylene, calcium carbonate, soy protein, biodegradation additive (e.g., EcoPure®) and thermoplastic starch. Thus, an advantage of the EarthPCB composition with the substituted soy protein may be that the resulting products are as strong or stronger than petroleum plastic, yet they are compostable, biodegradable, recyclable and non-toxic to the environment. An additional advantage may be that the components that make up the EarthPCB composition are widely available and cost-effective, rendering the resin an affordable and renewable alternative to petroleum-based plastic resins.

In another aspect, a method of making an earth plant-based compostable biodegradable composition is provided. The EarthPCB resin may comprise an ethanol-based PE, calcium carbonate, hemp hurd, thermoplastic starch, biodegradation additive, soy protein and biopolymer. The method of producing the earth plant-based compostable biodegradable composition may involve first milling the substrate copolymers into a fine powder, wherein each particle of the powder is approximately of the diameter 0.25 to 3.0 micrometers (microns). The green polyethylene may be milled to a fine powder of about 0.25 to 3.0 microns, and the substrate calcium carbonate may be milled to a fine powder of about 0.25 to 3.0 microns, and the two powders may be mechanically mixed together, forming a first mixture. The substrate hemp hurd may be milled to a fine powder of about 0.25 to 3.0 microns and mechanically mixed and blended dry with the first mixture, forming a second mixture. Then, the substrate thermoplastic starch may be milled to a fine granulated powder of about 0.25 to 3.0 microns and mechanically mixed and blended dry with the second mixture, forming a third mixture. The substrate biodegradation additive may be milled to a fine granulated powder of about 0.25 to 3.0 microns and then mechanically mixed and blended dry with the third mixture, forming the final EarthPCB composition. The biopolymer may then be heated to between about 220- and 360-degrees Fahrenheit (F) to achieve thermodynamic activation of the biopolymer, thus forming a polymer resin blend. Thus, an advantage of the method of producing the EarthPCB substrate may be that all components of the resin blend evenly and are blended dry without the need of applying heat during the mixing process. An additional advantage of the method of producing the EarthPCB substrate may be that the manufacturing process requires relatively low energy consumption.

In another aspect, a method of producing an earth plant-based compostable biodegradable substrate resin in pelletized form is provided. The method of producing the EarthPCB substrate copolymer may be provided with ethanol-based Green polyethylene from approximately 50 to 65% by weight, thermoplastic starch from approximately 30 to 50% by weight, and biodegradation additive from approximately 2 to 10% by weight. The method of producing the EarthPCB substrate copolymer may include first mill grinding each substrate copolymer separately into fine powders of about 0.25 to 3.0 microns. These fine powders may then be blended uniformly in a mechanical mixer for about 5 to 25 minutes for each powder, adding each substrate copolymer one at a time during the mixing process. The fine powders are blended dry with no heat in the mechanical mixer. When all three of the substrate copolymers have been mechanically agitated together dry, the complete mixture of substrate may be heated at a temperature of between about 220- and 360-degrees F. to achieve thermodynamic activation, thus establishing cohesion between each substrate copolymer and resulting in a substrate resin. Finally, the substrate resin may be cured at a temperature between about 250- and 360-degrees F. to form pelletized bioplastic that may be used in various manufacturing processes for the production of bioplastic products. Thus, an advantage of the method of producing the substrate resin may be that the resin can be used as a material to form numerous types of food and beverage containers, packaging, film, and similar plastic products. An additional advantage of the method may be that the resulting products will be recyclable, compostable and biodegradable.

The above aspects or examples and advantages, as well as other aspects or examples and advantages, will become apparent from the ensuing description.

BRIEF DESCRIPTION OF THE DRAWINGS

For exemplification purposes, and not for limitation purposes, aspects, embodiments or examples of the invention are illustrated in the figures of the accompanying drawings, in which.

DETAILED DESCRIPTION

Figure 1A:
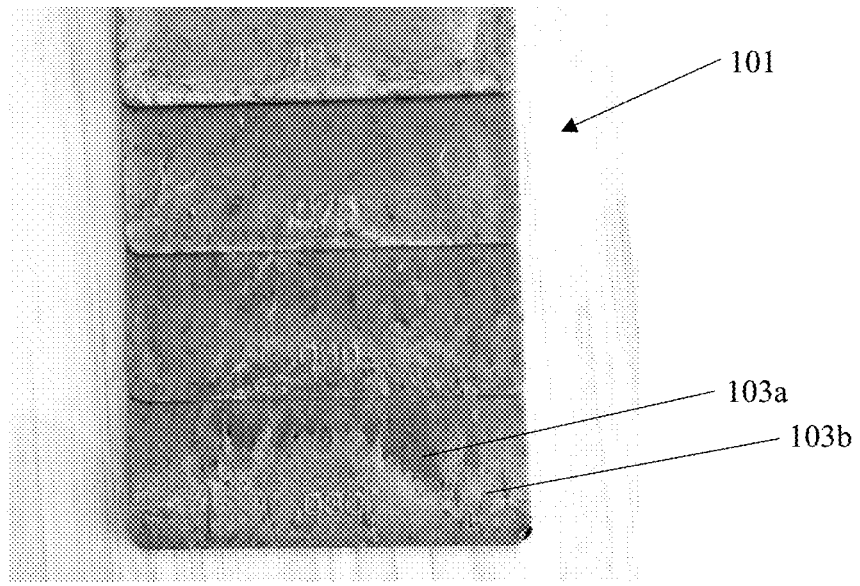
FIGS. 1A-1B illustrate exemplary embodiments of the earth plant-based compostable biodegradable composition made during testing, according to an aspect.

What follows is a description of various aspects, embodiments and/or examples in which the invention may be practiced. Reference will be made to the attached drawings, and the information included in the drawings is part of this detailed description. The aspects, embodiments and/or examples described herein are presented for exemplification purposes, and not for limitation purposes. It should be understood that logical modifications could be made by someone of ordinary skills in the art without departing from the scope of the invention. Therefore, the scope of the invention is defined by the accompanying claims and their equivalents.

It should be understood that, for clarity of the drawings and of the specification, some or all details about some components or steps that are known in the art are not shown or described if they are not necessary for the invention to be understood by one of ordinary skills in the art.

For the following description, it can be assumed that most correspondingly labeled elements across the figures possess the same characteristics and are subject to the same structure and function. If there is a difference between correspondingly labeled elements that is not pointed out, and this difference results in a non-corresponding structure or function of an element for a particular embodiment, example or aspect, then the conflicting description given for that particular embodiment, example or aspect shall govern.

The present invention relates to an earth plant-based (EarthPCB) composition and methods having eco-friendly properties, which can be effectively used to replace petroleum-based plastic. The EarthPCB composition may include additional advantageous properties, such as improved strength in bioplastic material, improved flexibility, moisture resistance, oxygen barrier, possible biodegradable properties, and composting. The materials that form the EarthPCB are also widely available and relatively low-cost. As will be described in this disclosure, the EarthPCB composition may comprise a polymer resin compounding of earth-based materials, a plant-based material resin comprising a hard pellet resin segment and soft segments. The hard pellet resin segment may comprise calcium carbonate (CaCO3) and the soft segments may comprise thermoplastic starch, hemp hurd, an ethanol-based Green polyethylene and a well-known biodegradation additive (e.g., EcoPure®). These segments may enable products made from the EarthPCB resin to compost and biodegrade after use, while also being non-toxic. Thus, an advantage may be that the earth plant compostable resin-based bioplastic can be used to replace petroleum-based plastics that are currently used in food and beverage packaging, as well as in other types of consumer products.

In an aspect, the EarthPCB composition may be provided with an ethanol-based Green polyethylene from approximately fifteen percent to seventy-five percent (15-75%) by weight in a preferred form of finely ground powder of about 0.25 to 3.0 micrometers (microns). The EarthPCB resin substrate may also be provided with CaCO3 from approximately fifteen to sixty percent (15 to 60%) by weight of fine powder generally in the preferred approximate diameter of 0.25-3.0 microns. The presence of calcium carbonate in the EarthPCB may be advantageous for particular applications wherein white plastic is desirable, such as in pill bottles, shampoo bottles, etc. Because calcium carbonate is naturally white, it may decrease the need for white colorant, which may decrease the cost of producing the EarthPCB for such applications. An additional advantage is that the EarthPCB uses lower concentrations of calcium carbonate than those of stone-based resins, which makes the EarthPCB composition less brittle.

The EarthPCB resin substrate may also be provided with hemp hurd from approximately two to seventy-five percent (2-75%) by weight milled into a fine powder of about 0.25 to 3.0 microns, as an example. Using hemp hurd to produce plastic may be a far better option than petroleum-based plastic as it is 100% biodegradable and recyclable. The EarthPCB resin substrate may also include thermoplastic starch (TPS), which is derived from starch granules that occur in plants (e.g., potatoes, wheat, rice, corn, cassava). The thermoplastic starch may be provided from approximately twenty percent to sixty percent (20-60%) by weight milled into a fine powder of about 0.25- to 3.0-micron particles.

Lastly, the EarthPCB resin may be provided with biodegradation additive in approximately one-half percent to ten percent (0.5-10%) by weight milled into a fine powder of about 0.25 to 3.0 microns, as an example. The biodegradation additive enables the products formed with the EarthPCB composition to biodegrade within 60 to 180 days under anaerobic conditions under ASTM D5511 (Standard Test Method for Determining Anaerobic Biodegradation of Plastic Materials), as well as compost in 30 to 90 days under anaerobic conditions. Thus, an advantage of the EarthPCB composition may be that bioplastic products made from the resin are as strong or stronger than petroleum plastic, yet they are compostable, biodegradable, recyclable and non-toxic to the environment.

It should be understood that within the ranges described above, various EarthPCB compositions can be formulated. Of the five components described above, tests revealed that three of the five components are critical to obtaining a suitable EarthPCB. These three components are the ethanol-based Green polyethylene, the thermoplastic starch, and the biodegradation additive. In an example, one may choose to combine 75% Green polyethylene by weight with 20% thermoplastic starch by weight, and 5% biodegradation additive by weight. In another example, one may choose to combine all five of the above components into a single composition, by ensuring the ratio of each component falls within the range described above for each component, and that the total of the ratios equals 100%, for example as follows: 40% Green polyethylene by weight, 20% calcium carbonate by weight, 15% hemp hurd by weight, 24.5% thermoplastic starch by weight and 0.5% biodegradation additive by weight.

In another aspect, the EarthPCB composition may be provided with soy protein as a substitute for the hemp hurd raw material. The EarthPCB composition with the substituted soy protein may thus comprise the soy protein from approximately two to ten percent (2-10%) by weight milled into a fine powder of about 0.25 to 3.0 microns in diameter. The remaining biopolymers (e.g., thermoplastic starch and Green polyethylene) may be provided in the same amounts by weight and of the same particle diameters as described previously above. Thus, an advantage of the EarthPCB composition with the substituted soy protein may be that products made with the resin are as strong or stronger than petroleum plastic, and are compostable, biodegradable, recyclable and non-toxic to the environment.

The EarthPCB resin described above may be produced from the following preferred formulas. A first exemplary formula of the EarthPCB composition may comprise 25% calcium carbonate by weight, 12% hemp hurd by weight, 17.5% Green polyethylene by weight, 45% thermoplastic starch by weight and 0.5% EcoPure® additive by weight.

In another exemplary formula, the EarthPCB composition may comprise 25% calcium carbonate by weight, 2% hemp hurd by weight, 27.5% Green polyethylene by weight, 45% thermoplastic starch by weight and 0.5% EcoPure® additive by weight.

In another exemplary formula, the EarthPCB composition may comprise 25% calcium carbonate by weight, 6% hemp hurd by weight, 23.5% Green polyethylene by weight, 45% thermoplastic starch by weight and 0.5% EcoPure® additive by weight.

In another exemplary formula, the EarthPCB composition may comprise 20% calcium carbonate by weight, 2% hemp hurd by weight, 45% Green polyethylene by weight, 32% thermoplastic starch by weight and 1% EcoPure® additive by weight.

In another exemplary formula, the EarthPCB composition may comprise 60% Green polyethylene by weight, 37% thermoplastic starch by weight and 3% EcoPure® additive by weight.

In another exemplary formula, the EarthPCB composition may comprise 25% calcium carbonate by weight, 2% hemp hurd by weight, 27.5% Green polyethylene by weight, 45% thermoplastic starch by weight and 0.5% EcoPure® additive by weight.

In a final exemplary formula, the EarthPCB composition may comprise 25% calcium carbonate by weight, 2% soy protein by weight, 27.5% Green polyethylene by weight, 45% thermoplastic starch by weight and 0.5% EcoPure® additive by weight.

As shown by the above preferred formulas, at least three of the substrate copolymers would need to be used to achieve a resin that is biodegradable and compostable. Those three substrate copolymers would be Green polyethylene from approximately fifty to seventy percent (50 to 70%) by weight, thermoplastic starch from approximately thirty to fifty percent (30 to 50%) by weight and biodegradation additive (e.g., EcoPure®) from approximately two to ten percent (2 to 10%) by weight. Thus, an advantage of the EarthPCB composition disclosed herein may be that bioplastic products made from the EarthPCB resin may be compostable, biodegradable and recyclable, even when using only the at least three substrate copolymers.

In tests conducted, EarthPCB resins made of two of the exemplary formulas described above were analyzed. These compositions, called "EPC 104" and "EPC 105," were tested according to impact (ASTM D256), tensile (ASTM D638), melt flow (ASTM D1238), specific gravity (ASTM D792), and ash test (ASTM D5630), as shown in Table 1 below. EPC 104 represents the exemplary embodiment of the EarthPCB resin comprising 25% calcium carbonate by weight, 2% hemp hurd by weight, 27.5% Green polyethylene by weight, 45% thermoplastic starch by weight and 0.5% EcoPure® additive by weight. EPC 105 represents the exemplary embodiment of the EarthPCB resin comprising 25% calcium carbonate by weight, 6% hemp hurd by weight, 23.5% Green polyethylene by weight, 45% thermoplastic starch by weight and 0.5% EcoPure® additive by weight.

TABLE 1

| Compound | Specific Gravity (g/cm$^3$) | Impact (Ftlb/in) | Tensile (psi) | Elongation (%) | Tensile Modulus (psi) | Melt Flow (g/10 min) |
| --- | --- | --- | --- | --- | --- | --- |
| EPC 104 | 1.35 | 0.30 | 1,689 | 0.62 | 319,162 | 0.75 |
| EPC 105 | 1.38 | 0.32 | 1,542 | 0.43 | 412,098 | 0.13 |

In particular, the compositions were tested against a PLA resin. It should be noted that during testing, it was observed that the presence of the thermoplastic starch in the composition lowered the melt flow rate to about 4.26 g/10 min on its own. Furthermore, as shown in Table 1, EPC 104 dropped the melt flow rate to under 1 g/10 min and EPC 105 dropped the melt flow rate to under 0.2 g/10 min, compared to the melt flow rate of the PLA resin, which is 7.5 g/10 min. As demonstrated by these results, an advantage of the EarthPCB resin may be the slowing of the melt flow rate, which may can be useful is certain applications and manufacturing processes. In another example test, the tensile modulus improved significantly due to the EarthPCB resins. The PLA resin's modulus is 190,000 psi, and EPC 105, which had the highest improvement, had a tensile modulus of 412,098 psi, as shown in Table 1. Thus, an additional advantage of the EarthPCB resin may be that bioplastics formed from the resin are stronger than PLA-based plastics.

Figure 1B:
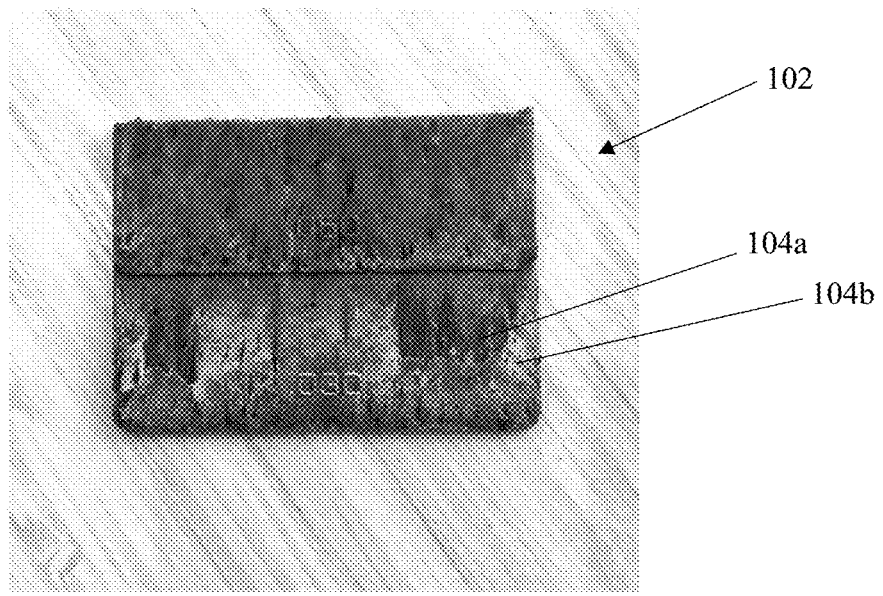

FIGS. 1A-1B illustrate exemplary embodiments of the earth plant-based compostable biodegradable composition made during testing, according to an aspect. FIG. 1A illustrates the exemplary embodiment EPC 104 discussed above (shown by 101). FIG. 1B illustrates the exemplary embodiment EPC 105 discussed above (shown by 102). The exemplary embodiments shown in FIGS. 1A-1B were made using traditional curing methods, by first melting down each component and mixing their melted forms. As shown in FIGS. 1A-1B, the EarthPCB resin embodiments made using this method vary in coloration and uniformity throughout the pieces of bioplastic 101, 102. For example, the presence of the darker areas 103a, 104a and the presence of the lighter areas 103b, 104b indicate nonuniform blending of the components during mixing in each of the EarthPCB embodiments. This nonuniform blending may cause nonuniform strength throughout, which may make the resulting bioplastic more prone to failure in particular applications.

As will be discussed in further detail herein below, during testing it was discovered that the mill grinding of each of the components before mixing the resin allows each component to blend uniformly.

In an aspect, a method of producing the EarthPCB composition is provided. The method of producing the EarthPCB resin substrate may first involve mill grinding each copolymer separately into a fine powder, wherein each particle is about 0.25 to 3.0 microns in diameter. The substrate copolymers may be Green polyethylene, CaCO3, hemp hurd, thermoplastic starch, biodegradation additive and optionally soy protein meal, as an example, and may be provided in solid state. Preselected amounts of each substrate copolymer may be measured out for producing the EarthPCB composition. The substrate copolymers may be ground or pulverized into this diameter range to enable a fine, powdered blending of each of the copolymers into a uniform composition. The particle size of the powdered copolymers may be measured via geometric methods, such as microscopy or sieving. In a preferred exemplary embodiment, the hemp hurd may be milled into a fine powder about 0.25 to 0.75 microns in diameter. Hemp hurd fibers, which form the inner core of the hemp stalk, are generally woody and therefore do not compound well or blend evenly on their own. Thus, when the hemp hurd is ground to a fine powder of about 0.25 to 0.75 microns in diameter, it blends and compounds more uniformly with the other substrate copolymers. Thus, an advantage of milling the hemp hurd into this fine powder size may be that the EarthPCB resin is stronger, more flexible, compostable and biodegradable.

Once each of the substrate copolymers are blended generally in the range from about 0.25 to 3.0 microns, the copolymers may be blended together and mechanically mixed with no heat. As an example, each component may be added one at a time to the mix in a mechanical mechanism, wherein the mixture is mixed for about 5 to 25 minutes at a time before the next substrate copolymer is added. Once all of the substrate copolymers have been mechanically agitated together dry, the resulting mixture may be heated to a temperature between about 220- and 360-degrees F. The heating of the final mixture of substrate achieves thermodynamic activation within the mixture, such that cohesion is established between each substrate copolymer of the mixture. The heating of the final mixture results in the final EarthPCB resin disclosed herein above. Thus, an advantage of the method of producing the EarthPCB resin may be that the resin can be used as a material to form numerous types of food and beverage containers, packaging, film, and similar plastic products. An additional advantage of the method may be that the resulting products will be recyclable, compostable and biodegradable.

The EarthPCB resin may be manufactured into an array of products and goods through thermoforming, blow molding, injection molding, bubble forming, vacuum farming, and pelletizing, as an example. The EarthPCB resin may be pelletized via a process involving extrusion, cutting the extruded strands, and curing to produce bioplastic products.

It should be understood that because of the mill grinding of each of the components that make up the composition, the curing process of the composition will be faster, thus reducing warehousing costs before production of various products made of the EarthPCB resin. As is known to one of ordinary skills in the art, pelletizing is the process of compressing or molding the substrate into the shape of a small pellet. These pellets can then be shipped to various manufacturers who use the pellets in their specific manufacturing processes such as injection molding, extrusion film, blow molding, etc. The melt flow rate of the EarthPCB substrate material under thermoforming, as an example, can be from about 7.5 to 4.26 g/10 min. A modifier in the form of an additive could be applied to the substrate to adjust the melt flow rate to about 7 to 3.5 g/10 min, as an example.

It should be understood that impact modifiers or temperature modifiers could be added to the substrate to make an obvious adjustment to the resin substrate's properties. As an example, an impact modifier could be added to the substrate to give products more strength if produced from the resin.

The EarthPCB composition may be provided with a method of producing bioplastic made from the EarthPCB resin, in an aspect. The method of producing the EarthPCB composition for forming bioplastic may first involve milling Green polyethylene and calcium carbonate into fine powders about 0.25 to 3.0 microns in diameter, and then mechanically mixing the two powders together, forming a first mixture. Hemp hurd may be milled into a fine powder about 0.25 to 3.0 microns in diameter and then mechanically mixed and blended dry with no heat with the first mixture, forming a second mixture. The second mixture thus comprises the mixed Green polyethylene, calcium carbonate and hemp hurd. It should be understood that soy protein could replace the hemp hurd in this exemplary method. Then, thermoplastic starch may be milled to a fine granulated powder about 0.25 to 3.0 microns in diameter and may be mechanically mixed and blended dry with no heat with the second mixture, forming a third mixture. Finally, the third and final mixture may be agitated at a temperature between about 220- and 360-degrees F. to thermodynamically activate and link material structures within each substrate copolymer, forming the EarthPCB resin. Blended material structural units are linked in a linear or branched manner via the heating bonding process. The EarthPCB resin may be cured at about 250- to 360-degrees F. to form a bioplastic in the form of a pelletized material. The pelletized material may then be used to form food and beverage products by extruding, blow molding injection, injection mold, etc. Thus, an advantage of the method of producing bioplastic from the EarthPCB resin may be that products currently made from plastic can now be made from compostable and biodegradable resin.

Traditional resin curing and mixing methods involve first melting down pelletized forms of each ingredient that makes up the composition. As disclosed above, the method of producing the EarthPCB resin involves mixing all ingredients into a final mixture in a powdered form, rather than mixing melted down pellets. Thus, an advantage of the method disclosed above may be that each component making up the composition may be mixed and blended dry with no heat.

It should be understood that the above described exemplary embodiments of the EarthPCB composition may be used specifically for a variety of applications. As an example, for the production of films for packaging, for example, hemp hurd or soy protein and calcium carbonate would preferably not be used in the making of the EarthPCB composition, as they could disrupt the integrity of the resulting film.

It may be advantageous to set forth definitions of certain words and phrases used in this patent document. It should be understood that the terms "substrate," "composition," and "resin" are used herein interchangeably. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Further, as used in this application, "plurality" means two or more. A "set" of items may include one or more of such items. Whether in the written description or the claims, the terms "comprising," "including," "carrying," "having," "containing," "involving," and the like are to be understood to be open-ended, i.e., to mean including but not limited to. Only the transitional phrases "consisting of" and "consisting essentially of," respectively, are closed or semi-closed transitional phrases with respect to claims.

If present, use of ordinal terms such as "first," "second," "third," etc., in the claims to modify a claim element does not by itself connote any priority, precedence or order of one claim element over another or the temporal order in which acts of a method are performed. These terms are used merely as labels to distinguish one claim element having a certain name from another element having a same name (but for use of the ordinal term) to distinguish the claim elements. As used in this application, "and/or" means that the listed items are alternatives, but the alternatives also include any combination of the listed items.

Throughout this description, the aspects, embodiments or examples shown should be considered as exemplars, rather than limitations on the apparatus or procedures disclosed or claimed. Although some of the examples may involve specific combinations of method acts or system elements, it should be understood that those acts and those elements may be combined in other ways to accomplish the same objectives.

Acts, elements and features discussed only in connection with one aspect, embodiment or example are not intended to be excluded from a similar role(s) in other aspects, embodiments or examples.

Aspects, embodiments or examples of the invention may be described as processes, which are usually depicted using a flowchart, a flow diagram, a structure diagram, or a block diagram. Although a flowchart may depict the operations as a sequential process, many of the operations can be performed in parallel or concurrently. In addition, the order of the operations may be re-arranged. With regard to flowcharts, it should be understood that additional and fewer steps may be taken, and the steps as shown may be combined or further refined to achieve the described methods.

If means-plus-function limitations are recited in the claims, the means are not intended to be limited to the means disclosed in this application for performing the recited function, but are intended to cover in scope any equivalent means, known now or later developed, for performing the recited function.

If any presented, the claims directed to a method and/or process should not be limited to the performance of their steps in the order written, and one skilled in the art can readily appreciate that the sequences may be varied and still remain within the spirit and scope of the present invention.

Although aspects, embodiments and/or examples have been illustrated and described herein, someone of ordinary skills in the art will easily detect alternate of the same and/or equivalent variations, which may be capable of achieving the same results, and which may be substituted for the aspects, embodiments and/or examples illustrated and described herein, without departing from the scope of the invention. Therefore, the scope of this application is intended to cover such alternate aspects, embodiments and/or examples. Hence, the scope of the invention is defined by the accompanying claims and their equivalents. Further, each and every claim is incorporated as further disclosure into the specification.

What is claimed is:

1. An earth plant-based compostable biodegradable composition for production of a bioplastic, the composition comprising calcium carbonate, hemp hurd, ethanol-based polyethylene, thermoplastic starch and biodegradation additive, wherein the calcium carbonate is 25% by weight, the hemp hurd is 12% by weight, the ethanol-based polyethylene is 17.5% by weight, the thermoplastic starch is 45% by weight, and the biodegradation additive is 0.5% by weight.

2. An earth plant-based compostable biodegradable composition for production of a bioplastic, the composition comprising calcium carbonate, hemp hurd, ethanol-based polyethylene, thermoplastic starch and biodegradation additive, wherein the calcium carbonate is 25% by weight, the hemp hurd is 2% by weight, the ethanol-based polyethylene is 27.5% by weight, the thermoplastic starch is 45% by weight, and the biodegradation additive is 0.5% by weight.

3. An earth plant-based compostable biodegradable composition for production of a bioplastic, the composition comprising calcium carbonate, hemp hurd, ethanol-based polyethylene, thermoplastic starch and biodegradation additive, wherein the calcium carbonate is 25% by weight, the hemp hurd is 6% by weight, the ethanol-based polyethylene is 23.5% by weight, the thermoplastic starch is 45% by weight, and the biodegradation additive is 0.5% by weight.

4. An earth plant-based compostable biodegradable composition for production of a bioplastic, the composition comprising calcium carbonate, hemp hurd, ethanol-based polyethylene, thermoplastic starch and biodegradation additive, wherein the calcium carbonate is 20% by weight, the hemp hurd is 2% by weight, the ethanol-based polyethylene is 45% by weight, the thermoplastic starch is 32% by weight, and the biodegradation additive is 1% by weight.

5. An earth plant-based compostable biodegradable composition for production of a bioplastic, the composition comprising calcium carbonate, hemp hurd, ethanol-based polyethylene, thermoplastic starch and biodegradation additive, wherein the calcium carbonate is 25% by weight, the hemp hurd is 2% by weight, the ethanol-based polyethylene is 27.5% by weight, the thermoplastic starch is 45% by weight, and the biodegradation additive is 0.5% by weight.

6. An earth plant-based compostable biodegradable composition for production of a bioplastic, the composition comprising calcium carbonate, soy protein, ethanol-based polyethylene, thermoplastic starch and biodegradation additive, wherein the calcium carbonate is 25% by weight, the soy protein is 2% by weight, the ethanol-based polyethylene is 27.5% by weight, the thermoplastic starch is 45% by weight, and the biodegradation additive is 0.5% by weight.

7. An earth plant-based compostable biodegradable composition for production of a bioplastic, the composition comprising ethanol-based polyethylene, thermoplastic starch and biodegradation additive, wherein the ethanol-based polyethylene is 60% by weight, the thermoplastic starch is 37% by weight, and the biodegradation additive is 3% by weight.

* * * * *